US012771730B2

(12) United States Patent
Miao et al.

(10) Patent No.: US 12,771,730 B2
(45) Date of Patent: Oct. 20, 2026

(54) INFORMATION CONFIGURATION METHOD, DOMAIN NAME RESOLUTION METHOD, ELECTRONIC DEVICE, AND STORAGE MEDIUM

(71) Applicant: ZTE CORPORATION, Shenzhen (CN)

(72) Inventors: Chuanyang Miao, Shenzhen (CN); Hao Tong, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 36 days.

(21) Appl. No.: 18/701,816

(22) PCT Filed: Feb. 22, 2022

(86) PCT No.: PCT/CN2022/077318

§ 371 (c)(1),
(2) Date: Apr. 16, 2024

(87) PCT Pub. No.: WO2023/065578

PCT Pub. Date: Apr. 27, 2023

(65) Prior Publication Data

US 2025/0141934 A1 May 1, 2025

(30) Foreign Application Priority Data

Oct. 20, 2021 (CN) .......................... 202111223114.9

(51) Int. Cl.
*H04L 9/40* (2022.01)

(52) U.S. Cl.
CPC ............ *H04L 63/205* (2013.01); *H04L 63/04* (2013.01)

(58) Field of Classification Search
CPC ........... H04L 2101/668; H04L 61/4511; H04L 61/59; H04L 63/04; H04L 63/0407; H04L 63/205; H04W 12/02
See application file for complete search history.

(56) References Cited

U.S. PATENT DOCUMENTS 7,916,739 B2 * 3/2011 Trostle ................ H04L 63/0428 370/401
8,082,451 B2 * 12/2011 Waris .................. G06F 21/6209 713/193

(Continued)

FOREIGN PATENT DOCUMENTS

| | | | |
|---|---|---|---|
| CN | 110502936 | A | 11/2019 |
| CN | 111343130 | A | 6/2020 |
| WO | 2018107729 | A1 | 6/2018 |

OTHER PUBLICATIONS

Tariq Saraj et al., Design and Implementation of a Lightweight Privacy extension of DNSSEC protocol, Conference: Thirteenth International Conference on Emerging Technologies (ICET) (2017) (Year: 2017).*

(Continued)

*Primary Examiner* — Sharon S Lynch
(74) *Attorney, Agent, or Firm* — Vivacqua Crane, PLLC

(57) ABSTRACT

An information configuration method, a domain name resolution method, an electronic device, and a storage medium are disclosed. The method may include determining a user privacy masking indication; and transmitting the user privacy masking indication to a second node, such that the second node masks user privacy information carried during a domain name resolution according to the user privacy masking indication.

7 Claims, 13 Drawing Sheets

(56) References Cited

U.S. PATENT DOCUMENTS

| | | | | |
|---|---|---|---|---|
| 8,850,009 | B2 * | 9/2014 | Larson | G06F 16/951 700/229 |
| 9,037,713 | B2 * | 5/2015 | Larson | G06F 16/951 709/227 |
| 9,386,000 | B2 * | 7/2016 | Larson | G06F 16/951 |
| 9,894,041 | B2 * | 2/2018 | Norum | H04L 63/0428 |
| 11,271,894 | B1 * | 3/2022 | McCarty | H04L 9/0825 |
| 11,277,373 | B2 * | 3/2022 | Buck | H04L 63/0236 |
| 11,750,363 | B2 * | 9/2023 | Cebere | H04L 9/3213 713/159 |
| 11,888,828 | B2 * | 1/2024 | Lehtikuja | H04L 61/59 |
| 2005/0041675 | A1 * | 2/2005 | Trostle | H04L 63/0853 370/401 |
| 2006/0221954 | A1 * | 10/2006 | Narayan | H04L 47/2441 370/389 |
| 2007/0061456 | A1 * | 3/2007 | Waris | G06F 21/6218 709/225 |
| 2010/0138551 | A1 * | 6/2010 | Degaonkar | H04L 61/2503 709/228 |
| 2013/0014226 | A1 * | 1/2013 | Larson | G06F 16/951 726/4 |
| 2019/0318106 | A1 | 10/2019 | Yu et al. | |
| 2021/0029074 | A1 * | 1/2021 | Buck | H04L 63/0407 |
| 2021/0258350 | A1 * | 8/2021 | Buck | H04L 63/0272 |
| 2022/0006797 | A1 * | 1/2022 | Lehtikuja | H04L 63/062 |

OTHER PUBLICATIONS

International Searching Authority. International Search Report and Written Opinion for PCT Application No. PCT/CN2022/077318 and English translation, mailed Jun. 29, 2022, pp. 1-10.

European Patent Office. Extended European Search Report for EP Application No. 22882203.7, mailed Sep. 4, 2025, pp. 1-12.

International Telecommunication Union Telecommunication Standardization Sector. "H.MCDN-CRRS 1-15 "Functional architecture of Content Request Routing Service in MCDN" (New): Output draft," Study Group 16, Q13/16-DOC14 (210922), Sep. 2021, pp. 1-34.

Internet Engineering Task Force. "Client Subnet in DNS Queries," rfc7871.txt, May 2016, pp. 1-30.

Internet Engineering Task Force. "Extension Mechanisms for DNS (EDNS(0))," rfc6891.txt, Apr. 2013, pp. 1-16.

* cited by examiner

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Message Serial Number | | | | | | | | | | | | | | | |
| QR | OPCODE | | | | AA | TC | RD | RA | res1 | res2 | res3 | RCODE | | | |
| QDCOUNT | | | | | | | | | | | | | | | |
| ANCOUNT | | | | | | | | | | | | | | | |
| NSCOUNT | | | | | | | | | | | | | | | |
| ARCOUNT | | | | | | | | | | | | | | | |

FIG. 13

| | |
|---|---|
| Header | OPCODE=SECQUERY |
| Question | QNAME=VIDEO.CT-IPTV.COM,QCLASS=IN,QTYOE=A |
| Answer | EMPTY |
| Authority | EMPTY |
| Additional | ROOT OPT<br>EDNS RR<br>-DNSMASK RR |

FIG. 14

| | |
|---|---|
| Header | OPCODE=SECQUERY |
| Question | QNAME=VIDEO.CT-IPTV.COM,QCLASS=IN,QTYOE=DNSMASK |
| Answer | EMPTY |
| Authority | EMPTY |
| Additional | EMPTY |

FIG. 16

INFORMATION CONFIGURATION METHOD, DOMAIN NAME RESOLUTION METHOD, ELECTRONIC DEVICE, AND STORAGE MEDIUM

CROSS-REFERENCE TO RELATED APPLICATION

This application is a national stage filing under 35 U.S.C. § 371 of international application number PCT/CN2022/077318, filed Feb. 22, 2022, which claims priority to Chinese patent application No. 202111223114.9 filed Oct. 20, 2021. The contents of these applications are incorporated herein by reference in their entirety.

TECHNICAL FIELD

The present disclosure relates to the field of wireless communication, and in particular to a method for configuring information, a method for domain name resolution, an electronic apparatus, and a storage medium.

BACKGROUND

With the development of wireless communication technology, in order to schedule users more accurately, Content Distribution Network (CDN) needs to know the personal representation of a user as much as possible. However, traditional Domain Name System (DNS) requests generally employ Internet Protocol (IP) address of the Local Domain Name System (LDNS) as the address of the DNS requester for Global Service Load Balance (GSLB) for determination in the principle of proximity. This processing method of DNS request is only suitable for the case that CDN provides coarse granularity. However, for the service downward of CDN nodes, the server is getting closer to users, and CDN GSLB is required to provide scheduling results in greater granularity. In some technical solutions, the DNS of the operator of public DNS resolution or the DNS resolver in the open DNS resolution service of network technology vendors are typically deployed near the egress of the Internet public network, and the deployment position is relatively high, so the address provided by public DNS resolution is no longer suitable for the scheduling accuracy required by CDN granularity. Therefore, at present, more and more DNS protocols-Extension Mechanisms for DNS (EDNS) are sampled and extended in the market to attach the personal sensitive information of the original requester to achieve accurate IP address acquisition.

In the traditional Internet services, the process of domain name resolution is typically transmitted in plain text. If ENDS is sampled to attach the personal sensitive information of the original requester, there is a risk of privacy leakage. For example, under the threat of man-in-the-middle attack, the attacker can easily obtain the additional privacy information in the DNS request message by detecting plain-text DNS in the middle. It is inefficient for the existing DNS extension mechanism to meet the requirements of CDN fine-grained scheduling.

SUMMARY

Provided are a method for configuring information, a method for domain name resolution, an electrical apparatus, and a storage medium in some embodiments of the present disclosure.

According to an embodiment of the present disclosure, a method for configuring information is provided. The method is applied to a first node. The method may include, determining a user privacy masking indication; and transmitting the user privacy masking indication to a second node, such that the second node masks user privacy information carried during a domain name resolution according to the user privacy masking indication.

According to an embodiment of the present disclosure, a method for configuring information is provided. The method is applied to a second node. The method may include, receiving a user privacy masking indication transmitted by a first node; and masking user privacy information carried during a domain name resolution according to the user privacy masking indication.

According to an embodiment of the present disclosure, a method for domain name resolution is provided. The method is applied to a second node. The method may include, acquiring a domain name resolution request from a terminal device; masking user privacy information in the domain name resolution request according to a user privacy masking indication; and sending the domain name resolution request with the masked user privacy information.

According to an embodiment of the present disclosure, a method for domain name resolution is provided. The method is applied to a first node. The method may include, receiving a domain name resolution request from a second node; generating a domain name resolution response information for the domain name resolution request; where the domain name resolution response information carries a user privacy masking indication; and feeding back the domain name resolution response information to the second node.

According to an embodiment of the present disclosure, an electronic apparatus is provided. The electronic apparatus may include at least one processor, and a memory storing at least one program thereon, which when executed by the processor, causes the processor to carry out any one of the methods as described above.

According to an embodiment of the present disclosure, a computer-readable storage medium is provided. The computer-readable storage medium stores thereon at least one program executable by at least one processor, which when executed by the processor, causes the processor to carry out any one of the methods as described above.

BRIEF DESCRIPTION OF DRAWINGS

FIG. 13 depicts a schematic diagram showing a format of a DNS message according to an embodiment of the present disclosure;

FIG. 14 depicts a schematic diagram showing a format of a DNS message according to an embodiment of the present disclosure;

FIG. 16 is an example diagram of another DNS message format provided by an embodiment of the present disclosure;

DETAILED DESCRIPTION

It should be understood that the embodiments described here are illustrative but not limiting.

In the following description, the use of suffixes such as “module”, “component” or “unit” to represent elements is only for the convenience of the description of the present disclosure, and they do not necessarily have a specific meaning. Therefore, “modules”, “components” or “units” can be used in combination.

Figure 1:
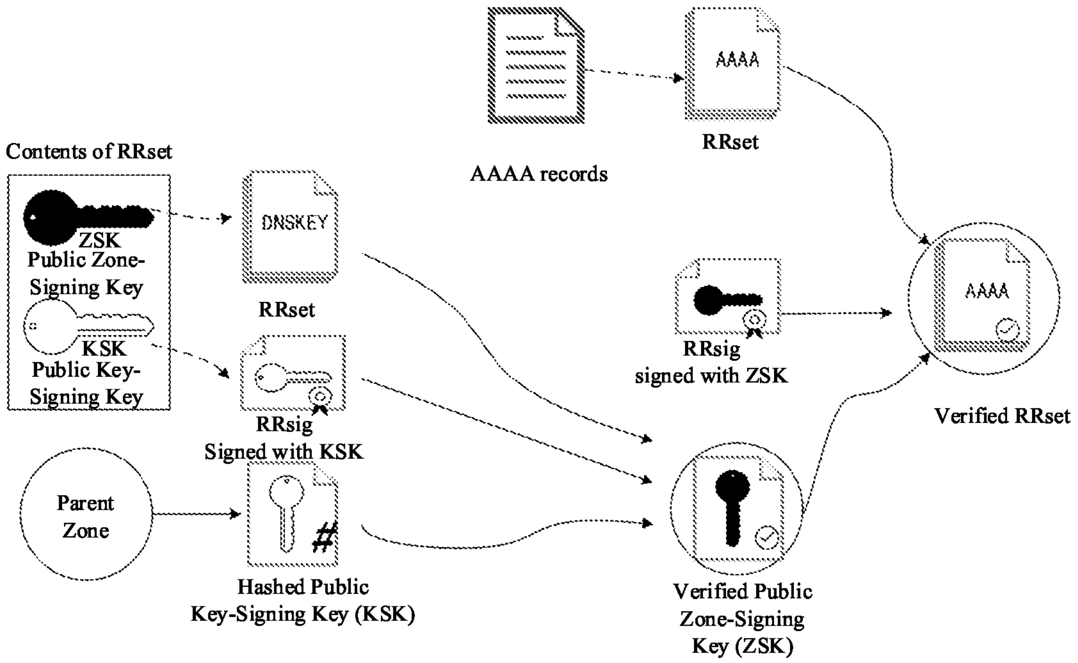
FIG. 1 depicts a schematic diagram showing a DNSSEC mechanism according to an embodiment of the present disclosure.
Figure 2:
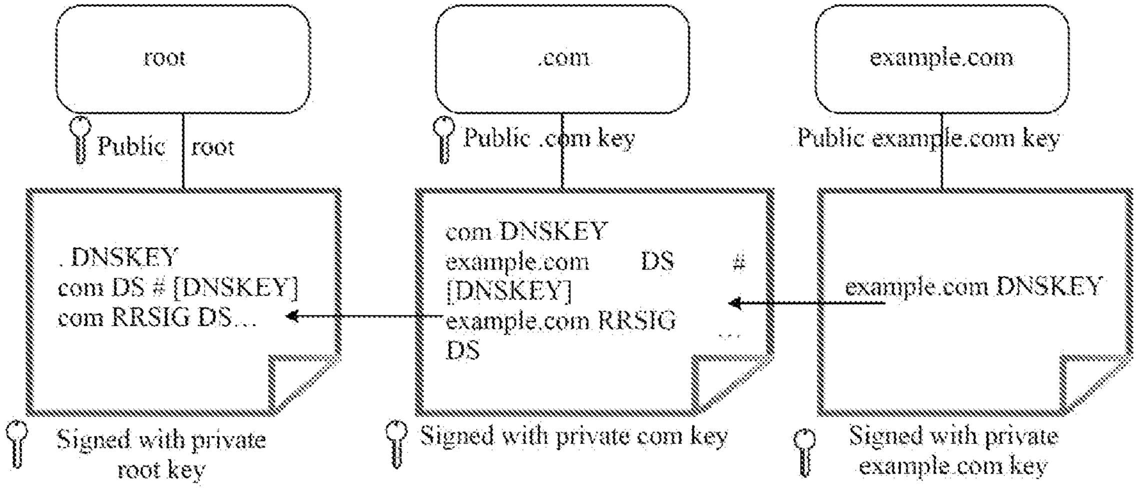
FIG. 2 depicts a schematic diagram showing a trust chain according to an embodiment of the present disclosure.

At present, the existing DNS security protection mechanisms mainly include domain name system security extensions (DNSSEC) protocol and a trust chain. In particular, DNSSEC protocol is a standard Internet Engineering Task Force (IETF) protocol with the main purpose to ensure the authenticity of results that DNS Name Servers (NSs) respond to the DNS request. The mechanism is as shown in FIG. 1: 1. DNSSEC signs DNS results stored in NS (for example, AAAA results). A typical signing process is to sign the results with the same label and store them in a Resource Record Signature (RRSIG) record. A zone key to pair ZSK can be employed in the signature, in which the private key is utilized for encryption and the public key is utilized for verification. 2. DESSEC creates DNSKEY of a standard DNS feedback type, which includes ZSK for verifying zone records and KSK for verifying the DNSKEY, where the signature is generated by encryption of private key KSK. 3. Refer to FIG. 2, a trust chain is created. In order to verify the authenticity of KSK, it is necessary to obtain the hash record DS #KSK of KSK from a node in its parent zone. If the hash values in the parent zone are consistent with those in the child zone, it indicates that the KSK in the child zone is trusted.

It is also possible to employ a DNSCurve to realize DNS security protection, and employ Curve25519 elliptic curve encryption algorithm to create the key utilized by Salsa20, with the MAC function Poly 1305 to encrypt and verify DNS network packets between the resolver and the authentication server. The public key of the remote authentication server is placed in the NS record such that the recursive resolver can know whether the server supports the DNSCurve. The key value starts with the magic string uz5, followed by the 51-byte Base32-encoded 255-bit public key of the server. The resolver then sends a packet containing DNSCurve public key, a 96-bit nonce and an encryption box containing a query to the server. The encryption box is created with the private key of the resolver, the public key of the server and the nonce. The response of the server contains a different 96-bit nonce and its own encryption box, which contain the answers to the query. The encryption tool used in DNSCurve is also employed in CurveCP, which is based on UDP instead of TCP protocol, and elliptic curve encryption algorithm is utilized for data encryption and authentication. DNSSEC is analogue to the PGP utilized in the encryption of a web page, while CurveCP and DNSCurve are analogue to the SSL utilized in the encryption and authentication of the channels. Just as PGP-signed web pages can be sent through SSL-encrypted channels, DNSSEC data can also be protected through DNSCurve.

Both DNSSEC and DNScurve provide an encryption method to protect DNS data, but their focuses are different. Theoretically, DNScurve provides more powerful protection, and operating like the TLS encryption mechanism of HTTPS.

However, the utilization of this mechanism requires extra computing power for the server, which has a certain impact on service quality and response speed.

Figure 3:
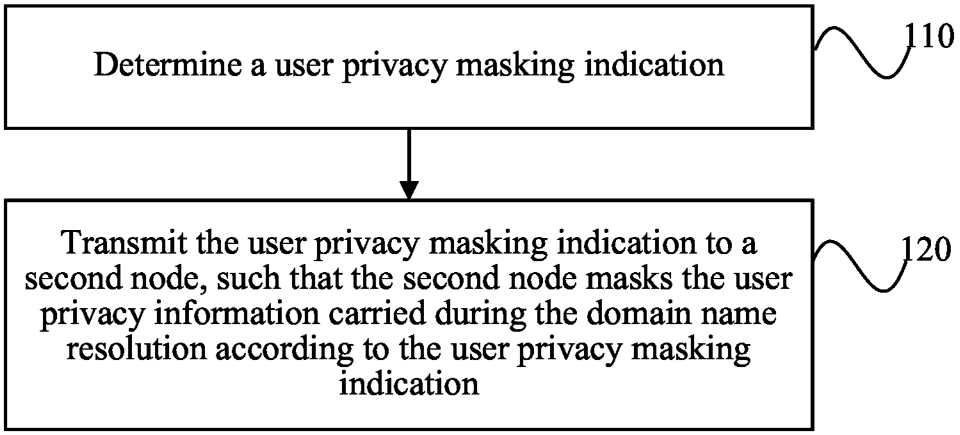
FIG. 3 depicts a flowchart showing a method for configuring information according to an embodiment of the present disclosure.

FIG. 3 depicts a flowchart showing a method for configuring information according to an embodiment of the present disclosure. This embodiment can be applied to the case for protecting user information during domain name resolution. The method can be performed by a first node. The first node can be a domain name resolution server, which may include a domain name resolution server authorized by an operator. The first node can be implemented through software and/or hardware. Referring to FIG. 3, the method includes the following operations.

At Step 110, a user privacy masking indication is determined.

In an embodiment, the user privacy masking indication can be the indication information intended to control the masking of user privacy during a domain name resolution. The indication information can be intended to indicate the scheme for masking the user privacy, the data employed for masking, and the like.

In an embodiment of the present disclosure, the first node determines the user privacy masking indication for controlling the masking of the user privacy during the domain name resolution.

At Step 120, the user privacy masking indication is transmitted to a second node, such that the second node masks the user privacy information carried during the domain name resolution according to the user privacy masking indication.

In an embodiment, the first node sends a user privacy masking indication to the second node. After receiving the user privacy masking indication, the second node masks the user privacy during the domain name resolution according to the mask scheme and data corresponding to the user privacy masking indication.

According to an embodiment of the present disclosure, the user privacy masking indication is determined and transmitted to the second node. The second node is controlled to mask the user privacy during the domain name resolution. Thereby, the security of user information during the domain name resolution can be improved, the extra overhead brought by deploying encryption keys can be reduced, and the domain name resolution efficiency can be improved.

In some examples, based on the above embodiment, the user privacy masking indication includes header information and substantive mask information.

In an embodiment of the present disclosure, the user privacy masking indication includes the header information and the substantive mask information. The header information stores parameters for indicating the masking of the user privacy such as an indication indicating the scheme employed for masking, an indication indicating the verification information employed for masking, or the like. The substantive mask information can be stored data employed during the masking for the user privacy.

In an embodiment, based on the above-mentioned embodiment(s), the header information of the user privacy masking indication at least includes at least one of, an identifier indication, a masking algorithm indication, or a masking protocol indication.

In an embodiment, the header information of the user privacy masking indication includes any combination of, an identifier indication, a masking algorithm indication, and a masking protocol indication. In an embodiment, the identifier indication identifies different attributes of parameters employed for masking different user privacy information through the different settings of bit positions. The masking algorithm indication identifies different methods by which the substantive mask information is utilized through the setting of different bit positions. The masking protocol indication identifies applicable protocols through the setting of different bit positions.

In an embodiment, based on the above embodiment(s), the identifier indication includes at least one of, masking indication information, reservation indication information, resource record extension indication information, data type indication information, or mask prefix indication information.

In an embodiment of the present disclosure, the identifier indication in the header information includes at least one of, masking indication information, reservation indication information, resource record extension indication information, data type indication information, or mask prefix indication information. Each piece of information can be positioned at a respective one of different bit positions of the identifier indication. Different setting methods on the corresponding bit positions of the information are indicative of different parameters. In an embodiment, the masking indication information is employed to indicate the processing method of user privacy masking. The method as indicated includes a plaintext processing, a data scrambling processing, a data encryption processing, and a data scrambling followed by encryption processing. The reservation indication information can be the data on one or more bits reserved in the identifier indication, which can be employed to extent the content of the indication subsequently. The resource record extension indication information is the indication information for indicating whether the key data is attached. Whether the key data is attached is identified by different setting methods. The data type indication information in the header information is indicative of the data type of the masked user privacy data. Different settings of bit position can indicate different data structures. The mask prefix indication information in the header information is indicative of the maximum masked length. The masked length refers to the length of masked user data started from left to right, or started from right to left. Different masked lengths are indicated by different setting methods.

In an embodiment, on the basis of the above-mentioned embodiment(s), the mask algorithm indication includes at least one of, an offset indication, an XOR indication, or an inversion indication.

In an embodiment of the present disclosure, the mask algorithm indication in the header information may be an indication of a method for employing the substantive mask information, and may include at least one of, an offset indication, an XOR indication, or an inversion indication. In an embodiment, the offset indication, the XOR indication and the inversion indication may be determined by different bit setting methods. In an embodiment, the offset indication indicates that the offset substantive mask information is employed during the mask of user privacy. The number of offset bits can be determined by the offset indication. The XOR indication indicates that the substantive mask information subjected to an XOR operation is employed during the mask of user privacy. The inversion indication indicates that the inverted substantive mask information is employed during the mask of user privacy.

Figure 4:
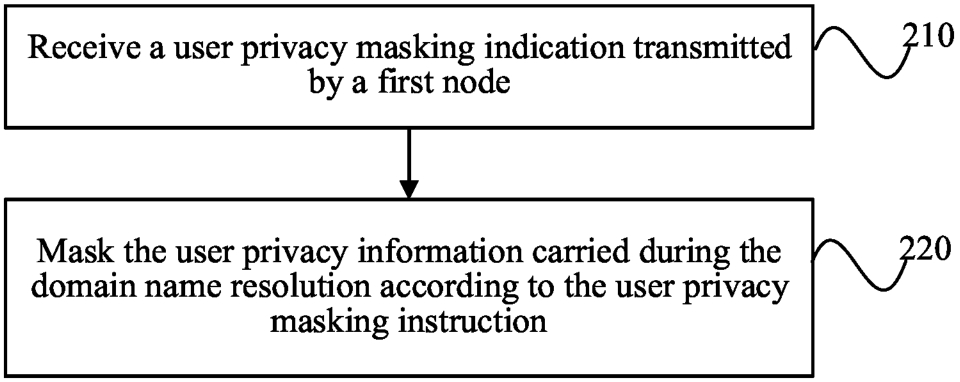
FIG. 4 depicts a flowchart showing another method for configuring information according to an embodiment of the present disclosure.

FIG. 4 depicts a flowchart showing a method for configuring information according to an embodiment of the present disclosure. This embodiment can be applied to the case for protecting user information during domain name resolution. The method can be performed by a second node. The second node can be a domain name resolution server, which may include a Local Domain Name System (LDNS). The second node can be implemented through software and/or hardware. Referring to FIG. 4, the method includes the following operations.

At Step 210, a user privacy masking indication transmitted by a first node is received.

In an implementation, the second node may receive the user privacy masking indication transmitted by the first node before domain name resolution. It can be understood that the second node may obtain the user privacy masking indication transmitted by the first node regularly or irregularly. Alternatively, the second node may obtain the user privacy masking indication transmitted by the first node before the domain name resolution is proceeded every time. In an embodiment of the present disclosure, the user privacy masking indication can be transmitted to the second node alone. Alternatively, the user privacy masking indication can be carried in another information (e.g., a domain name resolution request) and transmitted to the second node.

At Step 220, the user privacy information carried during the domain name resolution is masked according to the user privacy masking indication.

In an embodiment of the present disclosure, during the domain name resolution, the user privacy is masked according to the method indicated by the user privacy masking indication. Domain name resolution is then performed through the masked information.

According to an embodiment of the present disclosure, the second node receives the user privacy masking indication transmitted by the first node. The user privacy information carried during the domain name resolution is masked according to the user privacy masking indication. Thereby, the security of the user information in the domain name resolution process can be improved, the extra overhead brought by deploying encryption keys can be reduced, and the domain name resolution efficiency can be improved.

In some examples, based on the above embodiment, the user privacy masking indication includes header information and substantive mask information.

In an embodiment, based on the above-mentioned embodiment(s), the header information of the user privacy masking indication at least includes at least one of, an identifier indication, a masking algorithm indication, or a masking protocol indication.

In an embodiment, based on the above embodiment(s), the identifier indication includes at least one of, masking indication information, reservation indication, resource record extension indication, data type indication, or mask prefix indication.

In an embodiment, on the basis of the above-mentioned embodiment(s), the masking algorithm information includes at least one of, an offset indication, an XOR indication, or an inversion indication.

Figure 5:
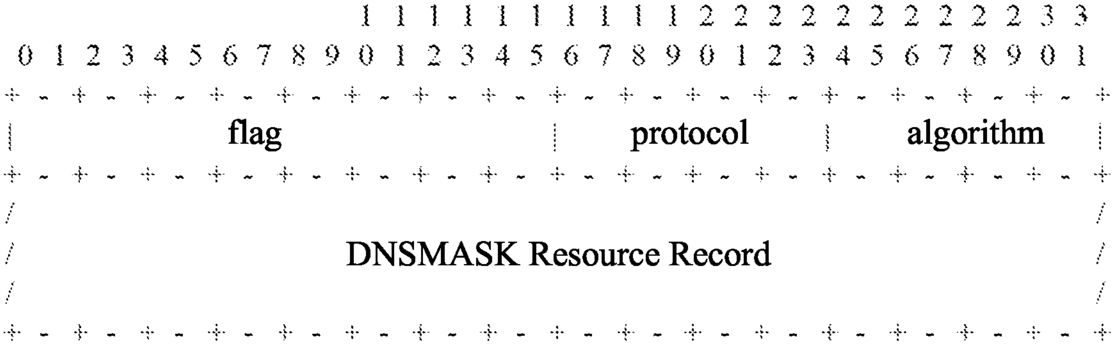
FIG. 5 depicts a schematic diagram showing a user privacy masking indication according to an embodiment of the present disclosure.
Figure 6:
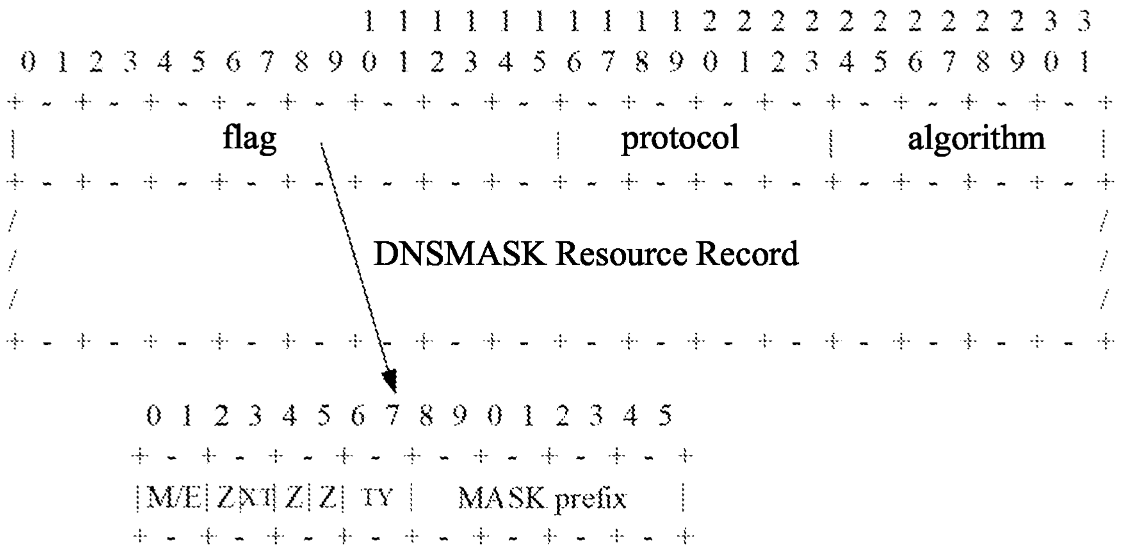
FIG. 6 depicts an example diagram showing a configuration of a user privacy masking indication according to an embodiment of the present disclosure.

FIG. 5 depicts a schematic diagram showing a user privacy masking indication according to an embodiment of the present disclosure. Referring to FIG. 5, a DNS resource record DNSMASK is proposed as a user privacy masking indication, and this record can be returned by an NS, thus facilitating the LDNS to mask privacy information during the subsequent domain name resolution. The format of DNSMASK is shown in FIG. 5. The recording format of the whole DNSMASK includes two parts: 1) a header information part with a length of 32 bit and 2) a substantive mask information part of DNSMASK. The length of substantive mask information part is variable. According to the different configuration of privacy protection mechanism, the RR record part may be divided into multiple layers, and each layer contains different variable-length masking indications, such as encryption public key, "pub-key", mask identifier 32.34.12.00, etc. Each part of DNSMASK can be configured as shown in FIG. 6. Referring to FIG. 6, the header information can be divided into three parts: "flag" part with the length of 16 bits, "protocol" part with the length of 8 bits, and "algorithm" part with the length of 8 bits.

The "flag" part can be further divided into a plurality of parts including "M/E", "Z", "XT", "TY" and "MASK prefix". The "M/E" part is a masking indication having the length of 2 bits to indicate the subsequent processing method for user privacy information, with setting "00" indicating a plain text method or indicating no preference in the request message to accept the method feedback from the server. Setting "01" indicates data scrambling, "10" indicates data encryption, and "11" indicates an encryption based on data scrambling. "Z" is a reserved bit having the length of 1 bit, which can be set to "0" generally. Bits 3, 5 and 6 in the "flag" part are set to "Z", which is convenient for subsequent extension as needed. "XT" indicates the resource record extension bit, which can occupy 1 bit. If this bit is set to "1", it indicates that a key data is appended after the DNSMASK Resource Record (RR). "TY" part indicates the data type, has the length of 2 bits, and is generally indicative of the type of user privacy data, such as user network address or device serial number, etc., where setting "00" indicates reservation, setting "01" indicates an IPV4 address, setting "10" indicates an IPV6 address, and setting "11" indicates String. "MASK prefix" part indicates the mask prefix bit, which indicates the maximum length that can be masked, usually starting from the right side of the data. For example, IPv4 is a 32-bit address. If this bit is set to "16", it indicates that 16 bits are masked from the right side of the address. (100.100.100.100→100.100.*.*/16).

"Protocol" part indicates the protocol that can be utilized for the mask code DNS MASK resource record, and different protocols can be allocated with a setting. For example, setting "100" indicates the DNS MASK protocol, indicating that the mask code in the subsequent DNS MASK RR record can be utilized for the DNS MASK protocol. It can be understood that the scheme set forth in the present disclosure can be not only applied to DNS MASK protocol, but also can be applied to other protocols. For example, setting "1" indicates the Transport Layer Security (TLS) protocol, setting "2" indicates email protocol, setting "3" indicates DNSSEC protocol, setting "4" indicates Internet Protocol Security (IPSEC) protocol, settings "5-254" are reserved for other protocols, and setting "255" indicates all protocols.

"Algorithm" part indicates how to use the mask code, and indicates the usage methods such as XOR, offset and inversion by different setting methods. In some examples, it can also indicate one or more of RSA algorithm, MD5 algorithm, Diffie-Hellman algorithm, or DSA algorithm.

Figure 7:
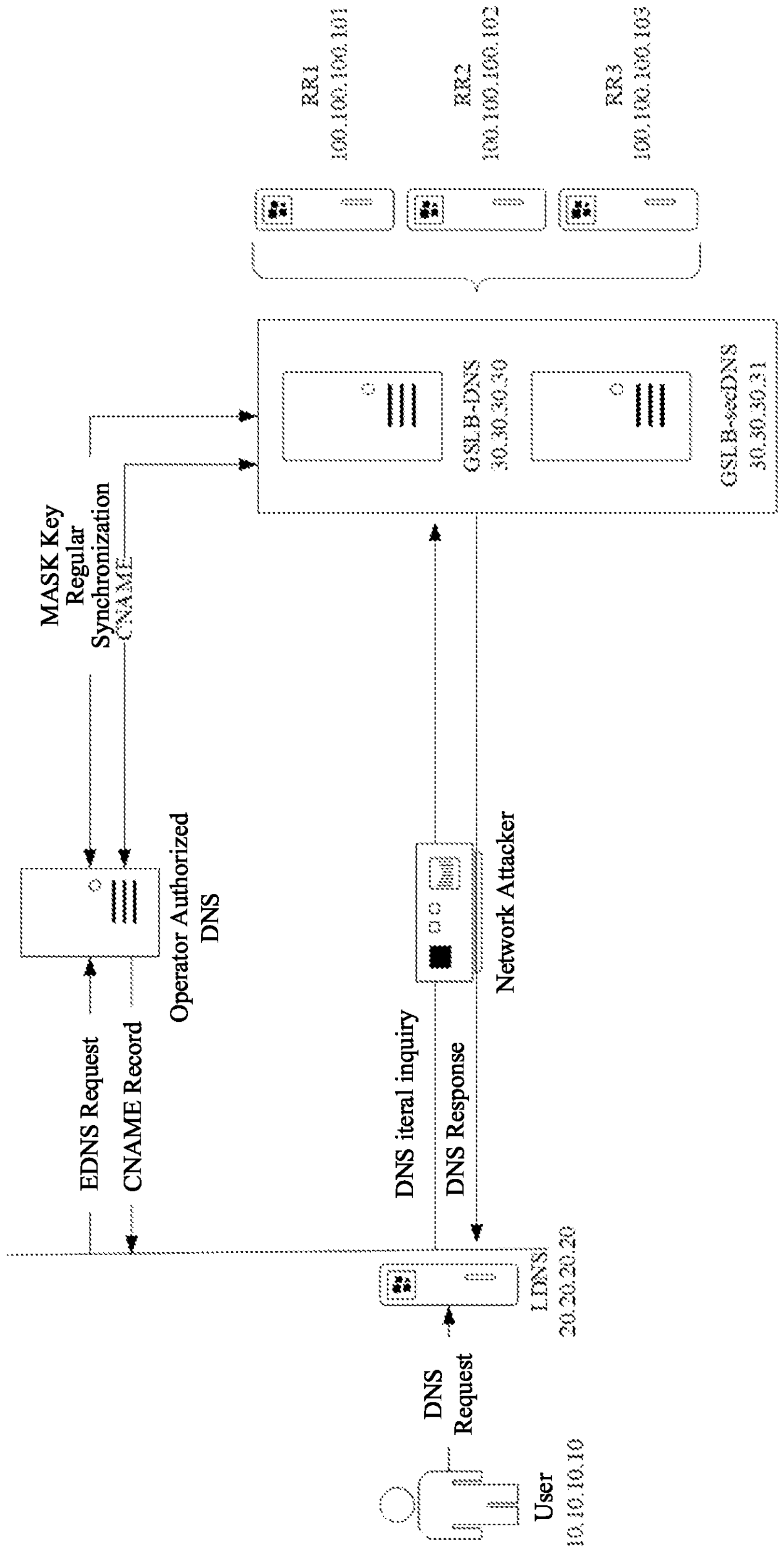
FIG. 7 depicts a schematic diagram showing an architecture for domain name resolution according to an embodiment of the present disclosure.

FIG. 7 depicts a diagram showing an architecture for domain name resolution according to an embodiment of the present disclosure, which may include LDNS, Global Service Load Balance (GSLB) DNS, GSLB-secDNS, or the like. An end user initiates a domain name resolution for vide.CTIPT.com and send DNS requests to the LDNS server. In an embodiment, the end user can also directly initiate an EDNS request, and directly carry the user's private information, such as IP address, into the DNS request. LDNS obtains the request information from the end user. If the LDNS finds that the request information carries the user IP or device ID, the LDNS enables the privacy protection mechanism according to the requirements. According to the domain name, LDNS iteratively queries the SP-NS of .CTIPTV.com authorized by the operator, and obtains the CANME record from a CDN. When LDNS starts privacy protection, the query message utilized by LDNS can be a special security query. If the authorization server can recognize the message, the server feeds back the related DNSMASK record; and if the authorization server can not recognize the message, the server can only feed back the normal message response. LDNS identifies whether an encryption protocol is enabled on the remote NS according to the attached message type in the feedback message. If the encryption protocol is enabled, the LDNS utilizes DNSMASK to process the privacy information in the original user information. Otherwise, LDNS starts the normal mode. In an embodiment, if the LDNS initiates a security request to the NS of the CDN again, one more operations are needed to determine whether the CDN-NS supports privacy protection. That is, the LDNS determines whether the CDN-NS supports privacy protection according to whether the NS of the CDN feeds back the DNSMASK record, and if the privacy protection is supported, the LDNS starts the request of attaching the DNSMASK again. 5) If GSLB (or CDN-NS) parses and finds the DNSMASK indication attached to the LDNS request, the GSLB (or CDN-NS) selects a special secure DNS server to redirect the DNS request. The secure DNS server utilizes a descrambling algorithm to restore the original privacy information, and makes corresponding feedback processing. The feedback information here can be plaintext or encrypted feedback information.

Figure 8:
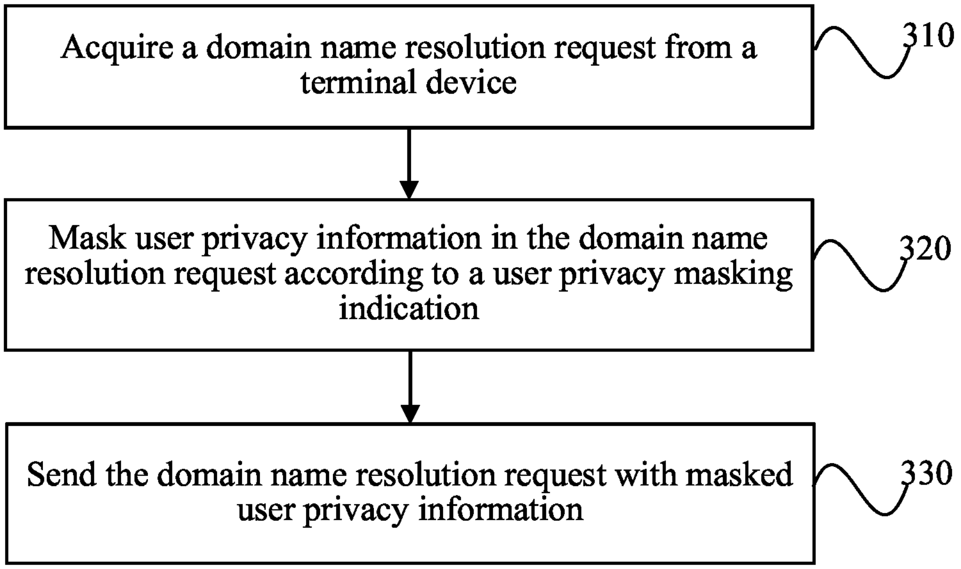
FIG. 8 depicts a flowchart showing a method for domain name resolution according to an embodiment of the present disclosure.

FIG. 8 depicts a flowchart showing a method for domain name resolution according to an embodiment of the present disclosure. This embodiment can be applied to the case for protecting user information during domain name resolution. The method can be performed by a second node. The second node can be a domain name resolution server, which may include a Local Domain Name System (LDNS). The second node can be implemented through software and/or hardware. Referring to FIG. 8, the method includes the following operations.

At Step 310, a domain name resolution request is acquired from a terminal device.

In an embodiment of the present disclosure, a domain name resolution request sent by a terminal device is received. The request may be a traditional domain name resolution request or a domain name resolution request based on ENDS protocol.

At Step 320, user privacy information in the domain name resolution request is masked according to a user privacy masking indication.

In an implementation, the user privacy information is masked according to the user privacy masking indication. The parameters and methods employed during the masking are determined by the user privacy masking indication.

At Step 330, the domain name resolution request with masked user privacy information is sent.

In an implementation, a domain name resolution request is sent. The user privacy information carried in the domain name resolution request is masked. It can be understood that the user privacy information can be a network address or a device serial number.

According to an embodiment of the present disclosure, a domain name resolution request is acquired from a terminal device. The user privacy information in the domain name resolution request is masked according to the user privacy masking indication. The domain name resolution request with masked user privacy information is sent. Thereby, the security of user information during the domain name resolution is improved, the extra overhead caused by the deployment of encryption keys is reduced, and the domain name resolution efficiency can be improved.

In an embodiment, on the basis of the above embodiment(s), before the user privacy information in the domain name resolution request is masked according to the user privacy masking indication, the method further includes an operation in which, a negotiation with a first node is performed to determine the user privacy masking indication.

In an embodiment of the present disclosure, the user privacy masking indication can be determined through a negotiation between the second node and the first node. It can be understood that the user privacy masking indication can be determined through the negotiation before the terminal device sends a domain name resolution request. The negotiation for determination can be a process in which the first node and the second node select a commonly supported masking method and masking parameters.

Figure 9:
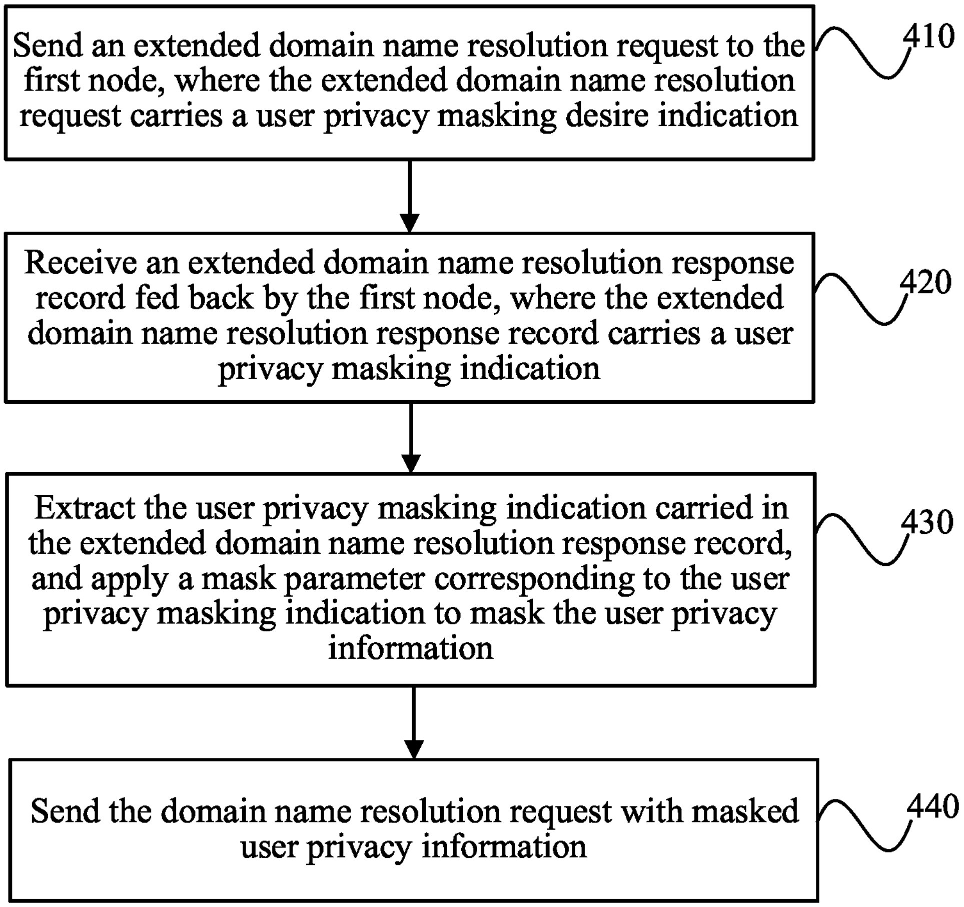
FIG. 9 depicts a flowchart showing another method for domain name resolution according to an embodiment of the present disclosure.

FIG. 9 depicts a flowchart showing another method for domain name resolution according to an embodiment of the present disclosure, which embodies the embodiment described above. Referring to FIG. 9, the method includes the following operations.

At Step 410, an extended domain name resolution request is sent to the first node. The extended domain name resolution request carries a user privacy masking desire indication.

In an implementation, the extended domain name resolution request is a domain name resolution request created based on ENDS protocol. The extended domain name resolution request carries the user privacy information. The user privacy masking desire indication may be an indication indicating a desire of the second node to mask the user privacy information.

In an implementation, the second node sends an extended domain name resolution request created based on the EDNS protocol to the first node. The request carries the user privacy masking desire indication.

At Step 420, an extended domain name resolution response record fed back by the first node is received. The extended domain name resolution response record carries a user privacy masking indication.

In an implementation, the extended domain name resolution response record is the information responsive to the extended domain name resolution request. The information includes a response to the extended domain name resolution request. The extended domain name resolution response record carries a user privacy masking indication generated by the first node according to its own ability and the user privacy masking desire indication in the extended domain name resolution request.

In an embodiment of the present disclosure, the second node receives an extended domain name resolution response record. The extended domain name resolution response record is generated by the first node according to the extended domain name resolution request and its own capabilities. The extended domain name resolution response record carries a determined user privacy masking indication.

At Step 430, the user privacy masking indication carried in the extended domain name resolution response record is extracted, and a mask parameter corresponding to the user privacy masking indication is applied to mask the user privacy information.

In an implementation, the mask parameter is data information utilized to mask the user privacy information. The mask parameter includes substantive mask information and the method for utilizing the substantive mask information.

In an implementation, the user privacy masking indication is extracted from the received extended domain name resolution response record. The corresponding mask parameters are determined according to the extracted user privacy masking indication. The user privacy information is masked by means of the mask parameters.

At Step 440, the domain name resolution request with masked user privacy information is sent.

In an embodiment of the present disclosure, the domain name resolution request with masked user privacy information is sent.

According to an embodiment of the present disclosure, an extended domain name resolution request that carries an extended user privacy masking desire indication is sent to a first node. An extended domain name resolution response record fed back by the first node is received. The extended domain name resolution response record carries the user privacy masking indication. The user privacy masking indication is extracted from the extended domain name resolution response record. The user privacy information in the domain name resolution request is masked according to a mask parameter corresponding to the user privacy masking indication. A domain name resolution request with masked user privacy information is sent. Thereby, the security of user information during the domain name resolution is improved, the extra overhead caused by the deployment of encryption keys is reduced, and the domain name resolution efficiency can be improved.

In an embodiment, on the basis of the above embodiment(s), the performance of the negotiation with the first node to determine the user privacy masking indication includes the operations in which:

a security extended domain name request is sent to a first node; where the security extended domain name request carries a user privacy masking desire indication or blank information; an extended domain name resolution response record fed back by the first node is received, where the extended domain name resolution response record carries a user privacy masking indication.

In an implementation, the security extended domain name request is a domain name request for increased security privacy function. The security extended domain name request triggers the first node to start the privacy protection mechanism.

In an embodiment of the present disclosure, the second node sends a security extended domain name request to the first node, such that the first node feeds back the user privacy masking indication. The security extended domain name request carries the user privacy masking desire indication or only blank information. It can be understood that the security extended domain name request can be employed to trigger the first node to feed back the user privacy masking indication. The security extended domain name request carries the user privacy masking desire indication. Alternatively, the user privacy masking desire indication is not carried in the security extended domain name request and is directly determined by the first node.

In an embodiment, based on the above embodiment(s), the user privacy masking indication is carried in the domain name resolution request, as an additional resource record of the domain name resolution request.

In an embodiment, the additional resource record is extended information of the domain name resolution request.

In an embodiment of the present disclosure, the user privacy masking indication is attached to the extended information of the domain name resolution request as an additional resource record, such that, the user privacy masking indication is transmitted along with the domain name resolution request.

In an embodiment, based on the above embodiment(s), the user privacy masking indication is carried in an extended domain name resolution request, as an additional resource record option of the extended domain name resolution request.

In an implementation, the additional resource record option is an option in the extended domain name resolution request. Different additional resource record options correspond to different parameters appended in the extended domain name resolution request. The user privacy masking indication serves as an additional resource record option of the extended domain name resolution request.

In an embodiment, based on the above embodiment(s), the user privacy masking indication is carried by an extended secure domain name resolution request. The type of the extended secure domain name resolution request is a secure request type.

In an embodiment of the present disclosure, the extended secure domain name resolution request is a secure domain name resolution request indicated by an extension bit in the secure domain name resolution request. The secure domain name resolution request carries a user privacy masking indication. In an embodiment of the present disclosure, it is possible to indicate whether to feed back the privacy masking indication by simply identifying whether the type of the extended security domain name resolution request is a security request type without the need for any additional resources. For example, when the extension bit of the security domain name resolution request is marked, the security domain name resolution request is an extended security domain name resolution request, and the corresponding type is a security request type.

Figure 10:
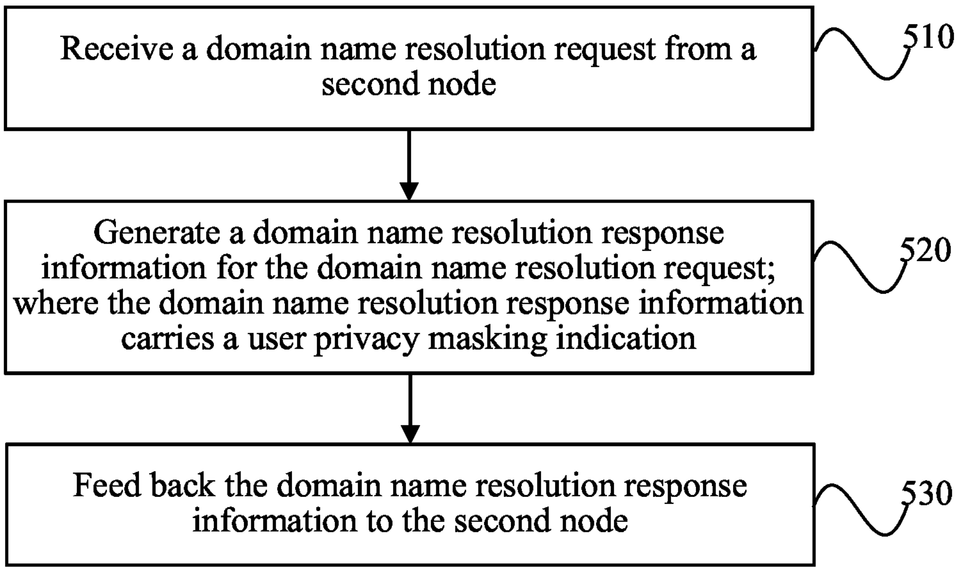
FIG. 10 depicts a flowchart showing a method for domain name resolution according to an embodiment of the present disclosure.

FIG. 10 depicts a flowchart showing a method for domain name resolution according to an embodiment of the present disclosure. This embodiment can be applied to the case for protecting user information during domain name resolution. The method can be performed by a first node. The first node can be a domain name resolution server, which may include a domain name resolution server authorized by an operator. The first node can be implemented through software and/or hardware. Referring to FIG. 10, the method includes the following operations.

At Step 510, a domain name resolution request is received from a second node.

In an implementation, the first node receives a domain name resolution request sent by the second node.

At Step 520, domain name resolution response information is generated for the domain name resolution request; where the domain name resolution response information carries a user privacy masking indication.

In an embodiment of the present disclosure, after receiving the domain name resolution request, the second node generates domain name resolution response information, and attaches a user privacy masking indication to the domain name resolution request.

At Step 530, the domain name resolution response information is fed back to the second node.

In an implementation, the generated domain name resolution response information is sent to the second node.

According to an embodiment of the present disclosure, the domain name resolution request of the second node is received. The domain name resolution response information corresponding to the domain name resolution request is generated. The domain name resolution response information carries the user privacy masking indication. The generated domain name resolution response information is sent to the second node. Thereby, the security of user information during the domain name resolution is improved, the extra overhead caused by the deployment of encryption keys is reduced, and the domain name resolution efficiency can be improved.

Figure 11:
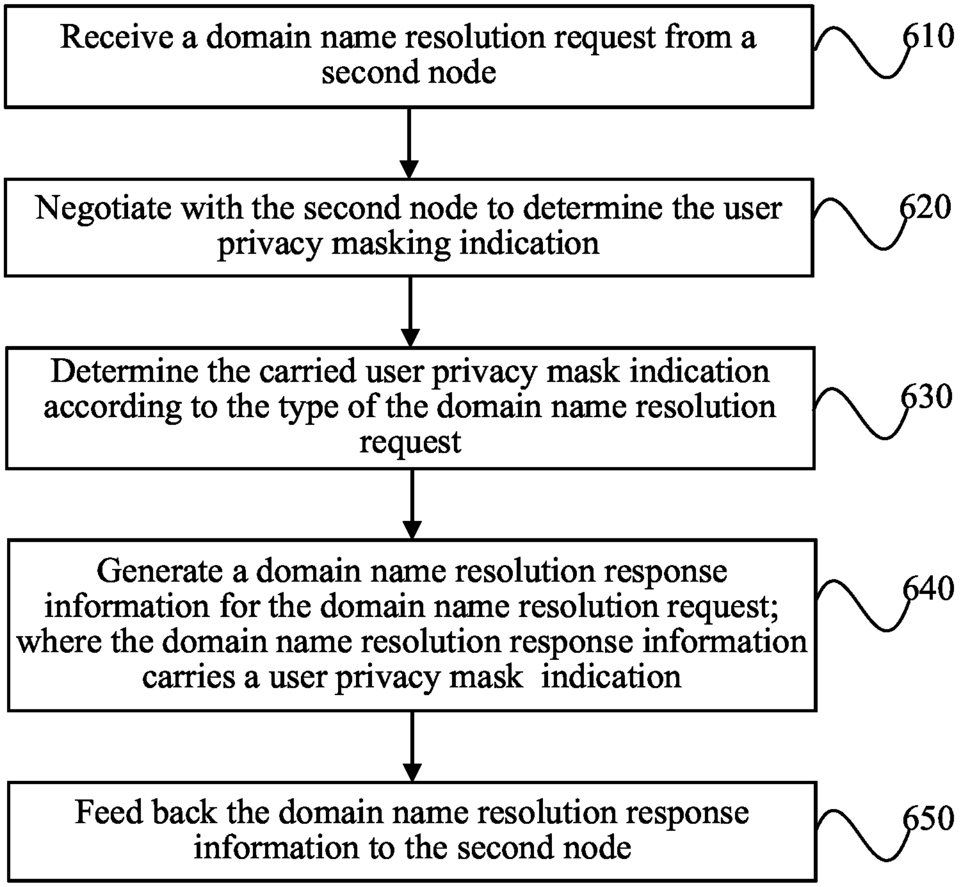
FIG. 11 depicts a flowchart showing another method for domain name resolution according to an embodiment of the present disclosure.

FIG. 11 depicts a flowchart showing another method for domain name resolution according to an embodiment of the present disclosure, which embodies the embodiment described above. Referring to FIG. 11, the method includes the following operations.

At Step 610, a domain name resolution request is received from a second node.

At Step 620, a negotiation with the second node is performed to determine the user privacy masking indication.

In an embodiment of the present disclosure, the user privacy masking indication can be determined by the negotiation between the first node and the second node before the user privacy masking indication is applied.

At Step 630, an attached user privacy masking indication is determined according to the type of the domain name resolution request.

In an implementation, after the domain name resolution request is received, it is determined the type of the domain name resolution request, such as an ordinary domain name resolution request, an extended domain name resolution request, or a secure extended domain name resolution request with a security mechanism. The user privacy masking indication carried in the domain name resolution request is determined according to the type. It can be understood that, the domain name resolution request can carry no user privacy masking indication. For example, if the type of domain name resolution request is ordinary domain name resolution request, the first node may not obtain user privacy masking indication, and the user privacy information is not masked during subsequent domain name resolution.

At Step 640, a domain name resolution response information is generated for the domain name resolution request; where the domain name resolution response information carries a user privacy masking indication.

In an embodiment of the present disclosure, corresponding domain name resolution response information is generated for the domain name resolution request. The generated domain name resolution response information carries a user privacy masking indication. The user privacy masking indication is determined by the type of the domain name resolution request, as discussed above.

At Step 650, the domain name resolution response information is fed back to the second node.

In an implementation, the first node sends the generated domain name resolution response information to the second node.

In an embodiment, on the basis of the above embodiment(s), the generation of the domain name resolution response information for the domain name resolution request further includes an operation in which an attached user privacy masking indication is determined according to the additional resource record of the extended domain name resolution request.

In an embodiment of the present disclosure, the first node determines whether the extended domain name resolution request carries a user privacy masking indication according to the additional resource record of the extended domain name resolution request. For example, in the case the additional resource record contains an identifier of the user privacy masking indication, it is determined that the extended domain name resolution request carries the user privacy masking indication, otherwise, the extended domain name resolution request does not carry the user privacy masking indication.

In an embodiment, on the basis of the above embodiment(s), performing the negotiation with the second node to determine the user privacy masking indication includes:

receiving an extended domain name resolution request from a second node, where the extended domain name resolution request carries a user privacy masking desire indication; parsing the extended domain name resolution request, and extracting the user privacy masking desire indication; modifying the mark bit of the user privacy masking desire indication according to a local user privacy masking indication to generate the user privacy masking indication; and sending an extended domain name resolution response to the second node, where the extended domain name resolution response includes a canonical name record and/or a user privacy masking indication.

In an embodiment, the first node receives an extended domain name resolution request sent by the second node, where the extended domain name resolution request carries a user privacy masking desire indication, parses the extended domain name request and extracts the user privacy masking indication. The first node modifies the mark bit of the user privacy masking desire indication according to the local user privacy masking indication corresponding to its own ability of the first node. The modified user privacy masking desire indication serves as the user privacy masking indication for use in the domain name resolution of the second node. The first node sends a user privacy masking indication to the second node through an extended domain name resolution response. The extended domain name resolution response includes a canonical name record and a user privacy masking indication.

In an embodiment, on the basis of the above embodiment(s), the method further includes an operation in which the canonical name record and/or the user privacy masking indication is encrypted by means of the encryption public key attached to the user privacy masking desire indication.

In an embodiment of the present disclosure, the extended domain name resolution response information fed back by the first node is encrypted. The canonical name record and/or the user privacy masking indication in the extended domain name resolution response information is encrypted by means of the encryption public key attached to the user privacy masking desire indication.

In an embodiment, on the basis of the above embodiment(s), the method further includes an operation in which, the user privacy masking indication is updated.

In an embodiment of the present disclosure, the user privacy masking indication in the first node is updated regularly. The user privacy masking indication in the first node is updated regularly by a third node. The third node can be a global service load balancing domain name system. The updated user privacy masking indication can be issued regularly by this system.

In an embodiment, based on the above embodiment(s), the user privacy masking indication is carried in the domain name resolution request, as an additional resource record of the domain name resolution request.

In an embodiment, based on the above embodiment(s), the user privacy masking indication is carried in an extended domain name resolution request, as an additional resource record option of the extended domain name resolution request.

Figure 12:
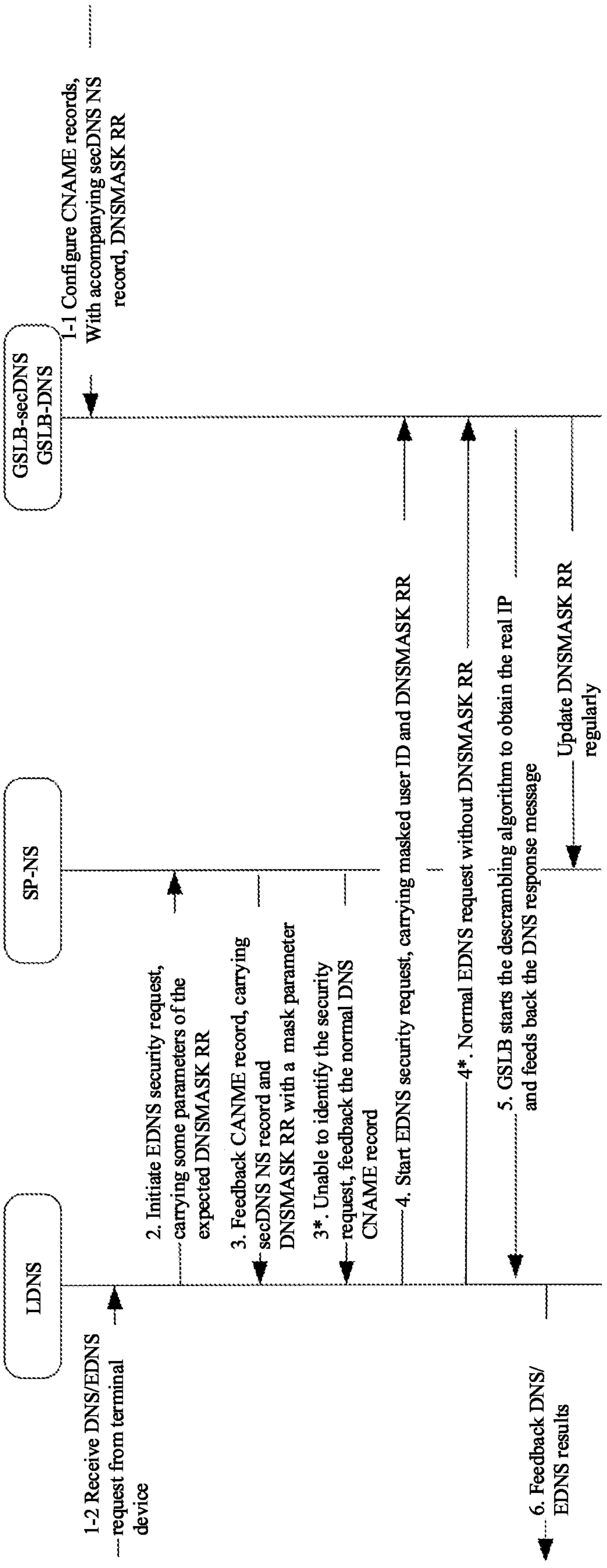
FIG. 12 depicts an example of another method for domain name resolution according to an embodiment of the present disclosure.

In an embodiment, based on the above embodiment(s), the user privacy masking indication is carried by an extended secure domain name resolution request. The type of the extended secure domain name resolution request is a secure request type. FIG. 12 depicts a schematic diagram showing another method for domain name resolution according to the embodiment of the present disclosure. Referring to FIG. 12, the privacy protection mechanism is enabled on the DNS server and the name server authorized by an operator. Additional privacy indications are carried in the DNS request and response mechanism, which is intended to mask sensitive information through the obtained privacy protection indicating factor when the DNS server and the GSLB of the CDN conduct the final address query. The domain name resolution process mainly includes the following operations.

1) GSLB-secDNS or GSLB-DNS configures a CNAME record for SP-NS, where the CNAME record carries a secDNS record and DNSMASK RR.

2) When the LDNS receives the DNS or EDNS request from the terminal device, the LDNS starts the privacy protection mechanism. LDNS sends an EDNS security request to SP-NS, which carries some or all parameters of the expected DNSMASK RR.
3) If the SP-NS can identify the security request of EDNS, the SP-NS feeds back CNAME record to LDNS. The CNAME record contains secDNS record and DNSMASK RR, and DNSMASK carries the mask parameter(s). If SP-NS cannot identify the EDNS security request, the SP-NS feeds back the normal CNAME record to LDNS.
4) If LDNS receives CNAME record with secDNS record and DNSMASK RR, the SP-NS masks the user IP in the EDNS security request according to DNSMASK RR, and sends the EDNS security request with masked user IP to GSLB-secDNS or GSLB-DNS, where the EDNS security request carries DNSMASK RR. If SP-NS receives a regular CNAME record, the SP-NS sends a regular EDNS request to the GSLB-secDNS or GSLB-DNS without DNSMASK RR.
5) LDNS receives DNS response messages fed back by GSLB-secDNS or GSLB-DNS, and obtains DNS results.
6) LDNS sends DNS result or EDNS result to the terminal device.

In some implementations, the DNSMASK RR of SP-NS can also be updated regularly by the GSLB-secDNS or GSLB-DNS.

In the above process, according to the configuration of CDN-NS, the pre-configuration of DNSMASK key (DNSMASK RR) can be divided into many situations. If the frequency of updating DNSMASK key by CDN-NS is not very high, for example, once a few days, it is suggested that LDNS provide the public key or utilize the encryption algorithm agreed with LDNS to encrypt DNSMASK records to protect the effectiveness of the DNSMASK key. If the frequency of updating DNSMASK by CDN-NS is high, such as once a few seconds or a few minutes, additional encryption may not be utilized, but regular updating is required between CDN-NS and SP-NS authorized by an operator. That is, the additional information in the whole CNAME record is updated. Alternatively, a random allocation table of DNSMASK in CNMAE record is created. Each time SP-NS replies, a combination of algorithm and DNSMASK key is selected randomly, and this information is attached to the response message. If necessary, the randomly assigned identifier can be indicated by the Z-bit flag in the flag of the extended DNSMAKS RR header.

FIG. 13 depicts a schematic diagram showing a format of a DNS message according to an embodiment of the present disclosure. Referring to FIG. 13, DNSMASK key is embedded in the format of the DNS message. During the domain name resolution, DNS message embedded with DNSMASK key is utilized for domain name resolution. Thereby, the OPCODE in the DNS message format is extended.

On the basis of the above embodiment(s), when the LDNS sends the EDNS security request to the operator authorized server, the utilized message format can be as shown in FIG. 14. The code of OPCODE needs to be extended, for example, "06" is utilized to indicate that this is a secure DNS request. If the regular request SQUERY is still utilized, the NS needs to be able to identify the data in the additional message record and the request is deemed as a security request by default. In this request, EDNS RR is attached and the OPT entry of DNSMASK is appended to the EDNS RR. It shall be noted that an encryption public key of LDNS can be attached if conditions permit.

Figure 15:
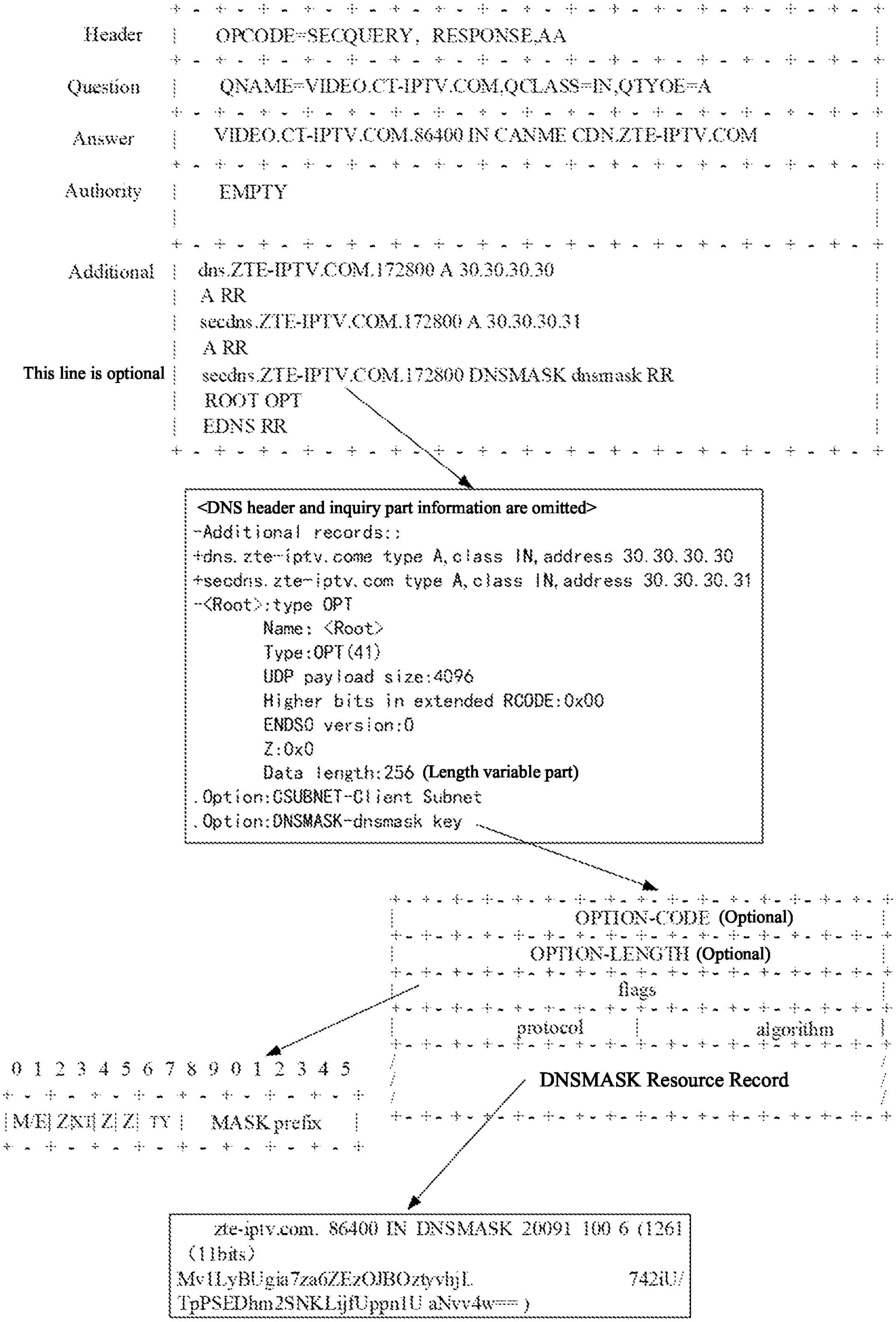
FIG. 15 depicts a schematic diagram showing a format of a DNS message according to an embodiment of the present disclosure.

On the basis of the above embodiment(s), when the operator authorized server feeds back the DNS query result, if the operator's NS can identify the security query, the NS further queries the domain name record video.CTIPTV.com and finds that there is a CNAME record of the CDN, and the CNAME record entry carries a DNSMASK record. The utilized message format can be as shown in FIG. 15. In the message feedback, besides the CNAME record, it also indicates that there are two NS records in the domain name system of ZTE-IPTV.com, one of which is an NS supporting security mechanism. Then in the future, LDNS needs to initiate a secure DNS request to this server. In addition, in the additional message, the record of DNSMASK RR is also fed back, in which the operator's NS adds relevant masking code information to the pre-configured DNSMASK RR according to the CDN, so as to inform the response masking code and masking mechanism. In an embodiment of the present disclosure, DNSMASK RR is provided with two message formats, including a single DNS TYPE and an OPT of EDNS. In particular, the complete structure of DNSMASK RR as a DNS response message record is shown in FIG. 15. When the operator's NS can identify the encryption public key attached to the LDNS, the entire DNSMASK RR or only the header information can be encrypted and then appended to the front end of the MASK key. In this way, the encryption algorithm for privacy is further protected.

On the basis of the above embodiment(s), after the LDNS obtains the NDSMASK record, the privacy information is masked by means of the DNSMASK key and the selected algorithm in the record. When the masked information is obtained, a query can be performed by an ordinary ENDS request, in which the masked privacy information can be added to other OPTs in ENDS in plain text, for example, the masked privacy information can be placed in the EDNS Client Subnet (ECS) or other OPTs that can indicate personal information. At the same time, another OPT of DNSMASK can be appended to the privacy information, in which the header information of DNSMASK can be set, for example, only the first two bits (M/E) of flag can be set as the relevant encryption type, and the rest can be left blank. In particular, the parts of protocol and algorithm should be set to 0 if possible. The DNSMASK key part can be left blank. If an encrypted feedback information is desired, the encryption public key information shall be attached.

On the basis of the above embodiment(s), after receiving the request from LDNS, the CDN GSLB first identifies whether the request is a secure DNS request. If request can not be identified by the CDN GSLB or the request is not a secure request, the request is handed over to a regular DNS NS server for regular processing. If the request can be identified by the CDN GSLB as a secure request, the request is handed over to secDNS NS for processing. SecDNS further identifies and extracts the privacy information attached to DNSMASK RR and other OPT (e.g., ECS) of the corresponding EDNS, and pairs the privacy information with the current scrambling algorithm according to the flag bit of DNSMASK RR, and then descrambles the privacy information, so as to obtain the correct privacy information and construct the analysis result. Further, when the user's encryption public key is attached to the request message, the feedback message needs to be further encrypted, or scrambled by means of the scrambling algorithm in DNSMASK. In addition, as in the above embodiment, if the acquisition of the DNSMASK RR record from the response of the LDNS fails, the LDNS can send a request to obtain the DNSMASK separately before sending the actual DNS request, as shown in FIG. 16. The GSLB then separately feeds back an RR record of the DNSMASK, which may not be served as an additional OPT of the EDNS in such a case.

Figure 17:
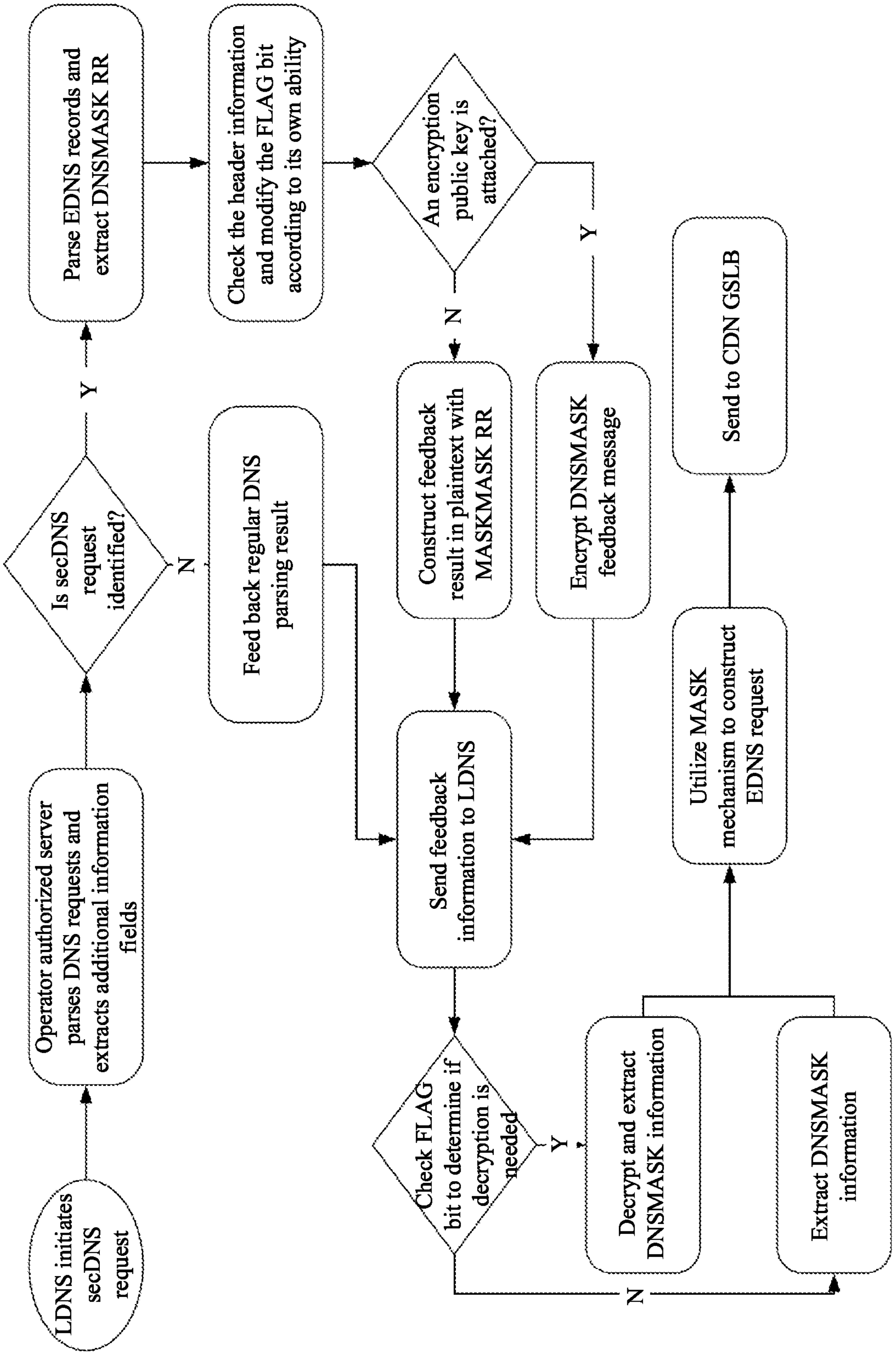
FIG. 17 depicts an example of a method for domain name resolution according to an embodiment of the present disclosure.

FIG. 17 depicts a schematic diagram showing a method for domain name resolution according to embodiment of the present disclosure. Referring to FIG. 17, the domain name resolution process based on user privacy masking indication may include the following processes. LDNS starts a secDNS request. The operator authorized server parses the DNS request to extract additional information fields, so as to determine whether the request is a secDNS request, if so, the server parses the ENDS record to extract the DNSMASK RR, otherwise, the server feeds back the ordinary DNS resolution result. After extracting DNSMASK RR, the server checks the header information of DNSMASK RR, and modifies the FLAG bit according to its own ability, and encrypts the DNSMASK feedback message by a determination as to whether the encryption public key is attached to the DNSMASK RR. LDNS receives DNS resolution result or DNSMASK feedback message, extracts DNSMASK information therefrom, utilizes MASK mechanism to mask user privacy information, constructs EDNS request, and sends the EDNS request to CDN GSLB.

Figure 18:
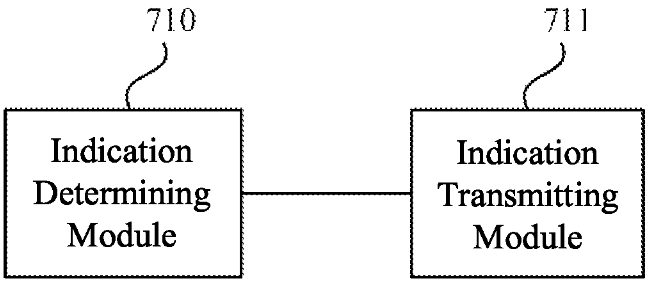
FIG. 18 depicts a schematic diagram showing a device for configuring information according to an embodiment of the present disclosure.

FIG. 18 depicts a schematic diagram showing a device for configuring information according to an embodiment of the present disclosure, which can perform the method for configuring information according to an embodiment of the present disclosure, which has corresponding functional modules and beneficial effects corresponding to the method. The device can be implemented by software and/or hardware, and includes an indication determining module 710 and an indication transmitting module 711.

The indication determining module 710 is configured to determine a user privacy masking indication.

The indication transmitting module 711 is configured to transmit the user privacy masking indication to a second node, such that the second node masks the user privacy information carried during the domain name resolution according to the user privacy masking indication.

In some examples, based on the above embodiment, the user privacy masking indication in the device includes header information and substantive mask information.

In an embodiment, based on the above-mentioned embodiment(s), the header information of the user privacy masking indication in the device at least includes at least one of, an identifier indication, a masking algorithm indication, or a masking protocol indication.

In an embodiment, based on the above embodiment(s), the identifier indication in the device includes at least one of, masking indication information, reservation indication information, resource record extension indication information, data type indication information, or mask prefix indication information.

In an embodiment, on the basis of the above-mentioned embodiment(s), the mask algorithm indication in the device includes at least one of, an offset indication, an XOR indication, or an inversion indication.

Figure 19:
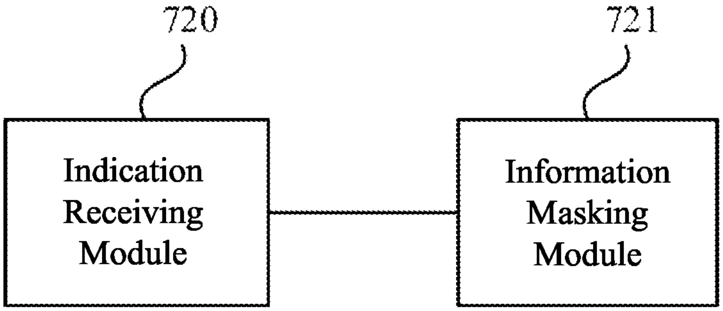
FIG. 19 depicts a schematic diagram showing another device for configuring information according to an embodiment of the present disclosure.

FIG. 19 depicts a schematic diagram showing another device for configuring information according to an embodiment of the present disclosure, which can perform the method for configuring information according to an embodiment of the present disclosure, which has corresponding functional modules and beneficial effects corresponding to the method. The device can be implemented by software and/or hardware, and includes an indication receiving module 720, and an information masking module 721.

The indication receiving module 720 is configured to receive a user privacy masking indication transmitted by a first node.

The information masking module 721 is configured to mask the user privacy information carried during a domain name resolution according to the user privacy masking indication.

In some examples, based on the above embodiment, the user privacy masking indication in the device includes header information and substantive mask information.

In an embodiment, based on the above-mentioned embodiment(s), the header information of the user privacy masking indication in the device at least includes at least one of, an identifier indication, a masking algorithm indication, or a masking protocol indication.

In an embodiment, based on the above embodiment(s), the identifier indication in the device includes at least one of, masking indication information, reservation indication information, resource record extension indication information, data type indication information, or mask prefix indication information.

In an embodiment, on the basis of the above-mentioned embodiment(s), the mask algorithm indication in the device includes at least one of, an offset indication, an XOR indication, or an inversion indication.

Figure 20:
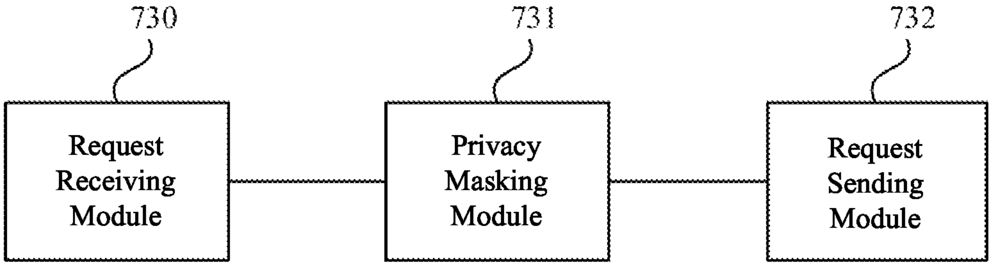
FIG. 20 depicts a schematic diagram showing a device for domain name resolution according to an embodiment of the present disclosure.

FIG. 20 depicts a schematic diagram showing a device for domain name resolution according to an embodiment of the present disclosure, which can perform the method for domain name resolution according to any one of the embodiments of the present disclosure, which has corresponding functional modules and beneficial effects corresponding to the method. The device can be implemented by software and/or hardware, and includes a request receiving module 730, a privacy masking module 731 and a request sending module 732.

The request receiving module 730 is configured to acquire a domain name resolution request from a terminal device.

The privacy masking module 731 is configured to mask the user privacy information in the domain name resolution request according to the user privacy masking indication.

The request sending module 732 is configured to send the domain name resolution request with the masked user privacy information.

In an embodiment, on the basis of the above embodiment(s), the device further includes an indication negotiation module, which is configured to negotiate with the first node to determine the user privacy masking indication.

In an embodiment, on the basis of the above embodiment(s), the indication negotiation module includes an extended request negotiation unit, which is configured to send an extended domain name resolution request to the first node. The extended domain name resolution request carries a user privacy masking desire indication. The extended request negotiation unit is further configured to receive an extended domain name resolution response record fed back by the first node. The extended domain name resolution response record carries a user privacy masking indication.

In an embodiment, on the basis of the above embodiment(s), the indication negotiation module includes a secure extended request negotiation unit, which is configured to send a secure extended domain name request to the first node. The secure extended domain name request carries a user privacy masking desire indication or blank information. The secure extended request negotiation unit is further configured to receive an extended domain name resolution response record fed back by the first node. The extended domain name resolution response record carries a user privacy masking indication.

In an embodiment, on the basis of the above embodiment(s), the privacy masking module 731 is configured to extract the user privacy masking indication carried in the extended domain name resolution response record, and apply a mask parameter corresponding to the user privacy masking indication to mask the user privacy information.

In an embodiment, based on the above embodiment(s), the user privacy masking indication in the device is carried in an domain name resolution request, as an additional resource record of the domain name resolution request.

In an embodiment, based on the above embodiment(s), the user privacy masking indication in the device is carried in an extended domain name resolution request, as an additional resource record option of the extended domain name resolution request.

Figure 21:
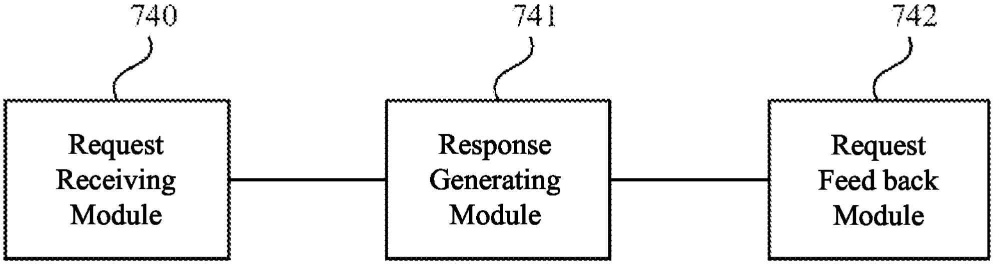
FIG. 21 depicts a schematic diagram showing another device for domain name resolution according to an embodiment of the present disclosure.

FIG. 21 depicts a schematic diagram showing another device for domain name resolution according to an embodiment of the present disclosure, which can perform the method for domain name resolution according to any one of the embodiments of the present disclosure, which has corresponding functional modules and beneficial effects corresponding to the method. The device can be implemented by software and/or hardware, and includes a request receiving module 740, a response generating module 741, and a request feedback module 742.

The request receiving module 740 is configured to receive a domain name resolution request from a second node.

The response generating module 741 is configured to generate domain name resolution response information for the domain name resolution request; where the domain name resolution response information carries a user privacy masking indication.

The request feedback module 742 is configured to feed back the domain name resolution response information to the second node.

In an embodiment, on the basis of the above embodiment(s), the device further includes an indication determination module, which is configured to determine an attached user privacy masking indication according to the type of the domain name resolution request.

In an embodiment, on the basis of the above embodiment(s), the device further includes another indication determination module, which is configured to determine an attached user privacy masking indication according to the additional resource record of the extended domain name resolution request.

In an embodiment, on the basis of the above embodiment(s), the device further includes an indication negotiation module, which is configured to negotiate with the second node to determine the user privacy masking indication.

In an embodiment, on the basis of the above embodiment(s), the indication negotiation module includes:

an extended receiving unit, configured to receive an extended domain name resolution request from the second node; where the extended domain name resolution request carries a user privacy masking desire indication;

a desire extraction unit, which is configured to parse the extended domain name resolution request and extract the user privacy masking desire indication;

an indication determination unit configured to modify a flag bit of the user privacy masking desire indication according to a local user privacy masking indication to generate the user privacy masking indication; and an indication feedback unit configured to send an extended domain name resolution response to the second node; where the extended domain name resolution response includes at least one of, a canonical name record, or the user privacy masking indication.

In an embodiment, on the basis of the above embodiment(s), the indication negotiation module further includes, an encryption unit configured to encrypt at least one of the canonical name record, or the user privacy masking indication by means of an encryption public key attached to the user privacy masking desire indication.

In an embodiment, on the basis of the above embodiment(s), the device further includes an indication update module, which is configured to update the user privacy masking indication.

In an embodiment, based on the above embodiment(s), the user privacy masking indication in the device is carried in a domain name resolution request, as an additional resource record of the domain name resolution request.

In an embodiment, based on the above embodiment(s), the user privacy masking indication in the device is carried in an extended domain name resolution request, as an additional resource record option of the extended domain name resolution request.

Figure 22:
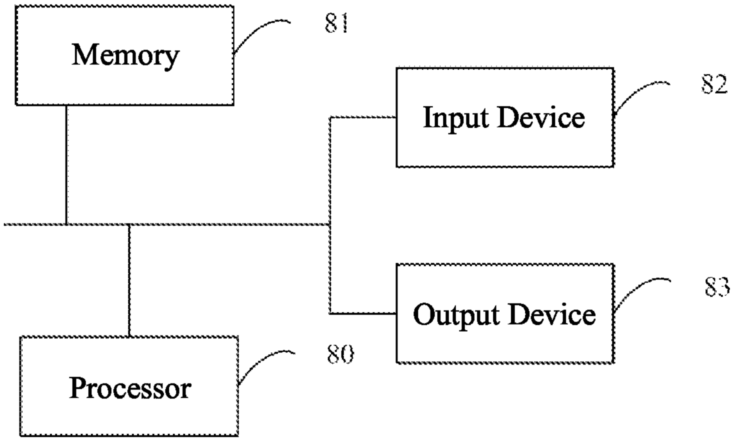
FIG. 22 depicts a schematic diagram showing an electronic apparatus according to an embodiment of the present disclosure.

FIG. 22 depicts a schematic diagram showing an electronic apparatus according to an embodiment of the present disclosure. The electronic apparatus includes a processor 80, a memory 81, an input device 82, and an output device 83. One or more processors may be provided, while one processor 80 is shown by way of an example in FIG. 22. The processor 80, the memory 81, the input device 82, and the output device 83 in the electronic apparatus can be connected by a bus or other means. FIG. 22 shows the connection implemented as a bus by way of an example.

As a computer-readable storage medium, the memory 81 can be configured to store software programs, computer-executable programs and modules, such as modules corresponding to the device described in an embodiment of the present disclosure (e.g., the indication determining module 710 and the indication transmitting module 711; or the indication receiving module 720 and the information masking module 721; or the request receiving module 730, the privacy masking module 731 and the request sending module 732; or the request receiving module 740, the response generating module 741 and the request feedback module 742.). The software programs, instructions and modules stored in the memory 81, when are executed by the processor 80, causes the processor 80 to perform various functional applications and data processing of the electronic apparatus, to carry out any one of the methods as described above.

The memory 81 may generally include a program storage section and a data storage section, in which the program storage section may store an operating system and application programs for performing at least one operation, and data storage section may store data created according to the operation of electronic apparatus, or the like. In addition, the memory 81 can include a high-speed random access memory and a nonvolatile memory, such as at least one disk memory device, a flash memory device, or other nonvolatile solid-state memory devices. In some implementations, the memory 81 may include memories remotely located relative to the processor 80, and these remote memories may be connected to the electronic apparatus through a network. Examples of the above networks include, but are not limited to, the Internet, intranet, local area network, mobile communication network, and combinations thereof.

The input device 82 may be configured to receive input numeric or character information and generate key signal input related to user settings and functional control of the electronic apparatus. The output device 83 may include a display device such as a screen.

An embodiment of the present disclosure further provides a storage medium containing computer-executable instructions, which, when executed by a computer processor, causes the processor to carry out a method for configuring information, which includes, determining a user privacy masking indication; and transmitting the user privacy masking indication to a second node, such that the second node masks user privacy information carried during a domain name resolution according to the user privacy masking indication.

Alternatively, the computer-executable instruction, when executed by a computer processor, causes the computer processor to carry out another method for configuring information, which includes:

receiving a user privacy masking indication transmitted by a first node;

masking user privacy information carried during a domain name resolution according to the user privacy masking indication.

Alternatively, the computer-executable instruction, when executed by a computer processor, causes the computer processor to carry out a method for domain name resolution, which includes:

acquiring a domain name resolution request from a terminal device;

masking user privacy information in a domain name resolution request according to a user privacy masking indication; and sending the domain name resolution request with the masked user privacy information.

Alternatively, the computer-executable instruction, when executed by a computer processor, causes the computer processor to carry out another method for domain name resolution, which includes:

receiving a domain name resolution request from a second node;

generating domain name resolution response information for the domain name resolution request; where the domain name resolution response information carries a user privacy masking indication; and feeding back the domain name resolution response information to the second node.

From the description of the above embodiments, it is apparent to a person having ordinary skills in the art that the above embodiments can be implemented by means of software with necessary general hardware, or by hardware, of course, but in many cases, the former is the better practice. Based on this understanding, the technical solution or the part that contributes to the prior art of the present disclosure can be embodied in the form of software products, which can be stored in a computer-readable storage medium such as floppy disk, Read-Only Memory (ROM), Random Access Memory (RAM), FLASH memory, hard disk or optical disk of a computer, etc., including several instructions to cause a computer device (which can be a personal computer, a server, or a network device, etc.) to carry out the methods described in various embodiments of the present disclosure.

It is worth noting that in the above embodiment of the device as described above, each unit and module included is only divided according to the functional logic, but it is not limited to the above division, as long as the corresponding functions can be realized. In addition, the specific names of each functional unit are only for the purpose of distinguishing them from each other and are not intended to limit the scope of the present disclosure.

It shall be appreciated by a person having ordinary skills in the art that all or some of the steps, functional modules/units in the methods, systems and devices disclosed above can be implemented as software, firmware, hardware and their appropriate combinations.

In the hardware implementation, the division between functional modules/units mentioned in the above description does not necessarily correspond to the division of physical components. For example, a physical component may have multiple functions, or a function or step may be performed by several physical components in cooperation. Some or all physical components can be implemented as software executed by a processor, such as a central processing unit, a digital signal processor or a microprocessor, or as hardware, or as an integrated circuit, such as an application specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be configured to store desired information and accessible by a computer. Furthermore, it is well known to a person having ordinary skills in the art that communication media usually contains computer-readable instructions, data structures, program modules or other data in modulated data signals such as carrier waves or other transmission mechanisms, and can include any information delivery media.

Some embodiments of the embodiments of the present disclosure are illustrated above in conjunction with the drawings, and the present disclosure are not limited thereto. Any modifications, equivalents, alternations, or improvements, made within the scope of the present disclosure shall be included in the scope of the present disclosure.

What is claimed is:

1. A method for domain name resolution, applied to a second node, the method comprising:

acquiring a domain name resolution request from a terminal device;

performing a negotiation with a first node to determine a user privacy masking indication, wherein the user privacy masking indication comprises header information and substantive mask information, the header information stores parameters for indicating masking of user privacy, and the substantive mask information stores data employed during the masking of the user privacy, wherein the parameters stored in the header information comprises an indication indicating the scheme employed for masking, or an indication indicating the verification information employed for masking; the header information of the user privacy masking indication comprises an identifier indication, and at least one of a masking algorithm indication, and a masking protocol indication; the identifier indication identifies different attributes of parameters employed for masking different user privacy information through different settings of bit positions; the masking algorithm indication identifies different methods by which the substantive mask information is utilized through the setting of different bit positions; and the masking protocol indication identifies applicable protocols through the setting of different bit positions;

masking user privacy information in the domain name resolution request according to the user privacy masking indication; and sending the domain name resolution request with the masked user privacy information.

2. The method according to claim 1, wherein performing the negotiation with the first node to determine the user privacy masking indication comprises:

sending an extended domain name resolution request to the first node;

wherein the extended domain name resolution request carries a user privacy masking desire indication; and receiving an extended domain name resolution response record fed back by the first node;

wherein the extended domain name resolution response record carries the user privacy masking indication;

wherein the identifier indication comprises at least one of, masking indication information, reservation indication information, resource record extension indication information, data type indication information, or mask prefix indication information;

the masking indication information is employed to indicate the processing method of user privacy masking;

the processing method as indicated comprises one of, a plaintext processing, a data scrambling processing, a data encryption processing, or a data scrambling followed by encryption processing;

the reservation indication information is data on one or more bits reserved in the identifier indication, which is employed to extent content of the indication; and the resource record extension indication information is for indicating whether the key data is attached; and the data type indication information in the header information is indicative of the data type of the masked user privacy data, the mask prefix indication information in the header information is indicative of a maximum masked length, and the masked length refers to the length of masked user data started from left to right, or started from right to left.

3. The method according to claim 1, wherein performing the negotiation with the first node to determine the user privacy masking indication comprises:

sending a secure extended domain name resolution request to the first node; wherein the secure extended domain name resolution request carries a user privacy masking desire indication or blank information; and receiving an extended domain name resolution response record fed back by the first node; wherein the extended domain name resolution response record carries the user privacy masking indication.

4. The method according to claim 1, wherein masking user privacy information in the domain name resolution request according to the user privacy masking indication, comprises:

extracting the user privacy masking indication carried in an extended domain name resolution response record, and applying a mask parameter corresponding to the user privacy masking indication to mask the user privacy information.

5. The method according to claim 1, wherein the user privacy masking indication is carried by the domain name resolution request, as an additional resource record of the domain name resolution request.

6. The method according to claim 1, wherein the user privacy masking indication is carried by an extended domain name resolution request, as an additional resource record option of the extended domain name resolution request.

7. The method according to claim 1, wherein the user privacy masking indication is carried by an extended secure domain name resolution request, wherein the extended secure domain name resolution request is of a security request type.

* * * * *